United States Patent Office 3,524,801
Patented Aug. 18, 1970

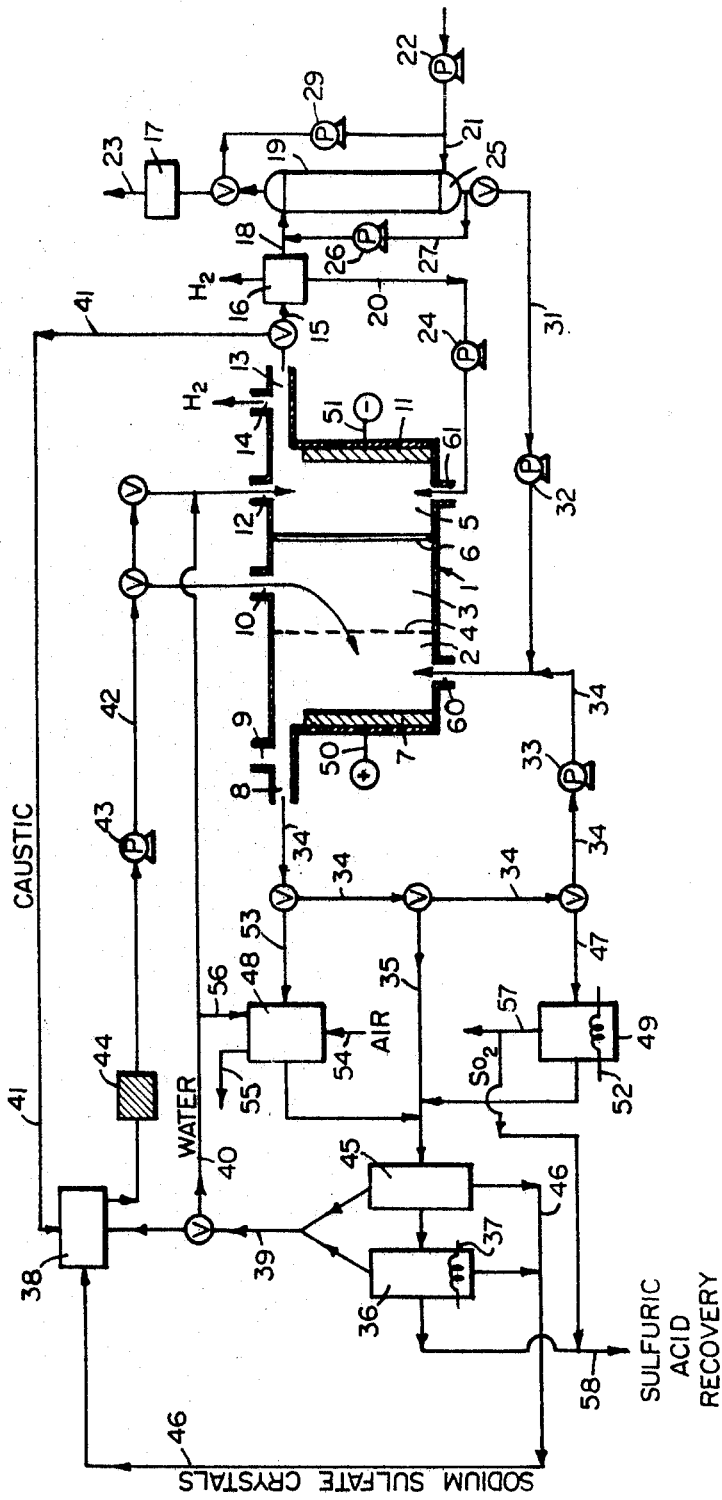

3,524,801
PROCESS FOR PRODUCING SULFURIC ACID
FROM $SO_2$ CONTAINING WASTE GAS
Edgardo J. Parsi, Watertown, Mass., assignor to
Ionics, Incorporated, Watertown, Mass.
Continuation-in-part of application Ser. No. 693,903,
Dec. 27, 1967. This application Feb. 9, 1968, Ser. No.
704,284
Int. Cl. B01d 13/02; B01k 3/00; C01b 17/56
U.S. Cl. 204—104                             13 Claims

ABSTRACT OF THE DISCLOSURE

This invention is directed to a cyclic process for the removal of $SO_2$ from an $SO_2$ containing waste gas with subsequent recovery of at least some of the $SO_2$ in the form of sulfuric acid. A three compartment diaphragm type electrolytic cell is employed to convert a feed solution of an alkali metal sulfate salt into its corresponding acidic and basic components. The basic caustic solution will absorb the $SO_2$ from the waste gas forming primarily an alkali metal bisulfite which is at least partially oxidized into bisulfate and the resulting liquid mixture evaporated to separate out alkali metal sulfate crystals. The crystals are redissolved in water and cycled back to feed to the electrolytic cell. The mother liquid of sulfuric acid remaining from the crystallization step is collected as a valuable product.

---

This application is a continuation-in-part of my copending application, Ser. No. 693,903 filed Dec. 27, 1967 entitled "Electrolytic Cell for Removal and Recovery of $SO_2$ From Waste Gases."

This invention concerns a process for the removal of $SO_2$ from a gaseous waste mixture and its subsequent recovery in the form of sulfuric acid. In particular it relates to the electrolytic conversion of an alkali metal sulfate salt into its corresponding acid salt and caustic solution with the aqueous caustic used to absorb the $SO_2$ from the waste gas to form predominately a bisulfite salt solution. Specifically it relates to oxidizing the bisulfite of a spent caustic solution to bisulfate and thereafter treating the resulting liquid to separate out crystals of an alkali metal sulfate from a sulfuric acid mother liquid.

In a copending application of Wayne A. McRae et al., Ser. No. 625,149 filed Mar. 22, 1967, now Pat. No. 3,475,-122 there is disclosed, inter alia a three compartment electrolytic cell which is employed in a continuous, cyclic, liquid phase absorption process for removing $SO_2$ from dilute $SO_2$ containing waste gases and recovering the valuable $SO_2$ as a concentrated gas stream for eventual conversion into sulfuric acid. In practice it has been found that the total amount of concentrated $SO_2$ gas which is recovered is less than the total quantity of $SO_2$ gas entering the system. It is believed that this loss of $SO_2$ gas is due to its oxidation into bisulfate. Although this oxidation which occurs primarily during $SO_2$ absorption constitutes only a small percentage of the total $SO_2$ present, it is highly undesirable since it remains in the scrubber system to upset the stoichiometric balance between the acidic and basic components of the system. This chemical oxidation however small will eventually build up excess acid into the overall system so that the reformed alkali metal sulfate salt resulting from the neutralization reaction between the acidic and basic solutions will have an acid pH. It is highly desirable that the reformed sulfate solution such as sodium sulfate be close to the neutral point before being recycled back as a feed solution to the center compartment of the electrolytic cell. This excess acid must be neutralized or otherwise removed from the overall system and in my copending parent application No. 693,903 there is fully disclosed therein a four compartment electrolytic cell for use in a process for removing this excess acid.

My present invention however employs the use of the three compartment electrolytic conversion cell in an unique and novel manner to recover the absorbed $SO_2$ primarily as sulfuric acid. Thus the above described oxidation of the $SO_2$ into sulfuric acid is not a problem in this present invention.

It is therefore an object of this invention to provide an improved cyclic process for the alkaline liquid absorption of acidic gases such as $SO_2$ and its subsequent direct recovery from the overall system as sulfuric acid.

Another object is to provide a process which in certain embodiments eliminates the necessity of stripping off and recovering concentrated $SO_2$ gas.

Another object is to provide a process for electrolytically oxidizing the bisulfite containing spent caustic solution to bisulfate.

Another object is to depolarize the anode of the electrolytic cell thereby reducing anode voltage drop, increasing anode life and eliminating or reducing the amount of oxygen gas generated at the anode.

Another object is to provide a process to recover sodium sulfate and sulfuric acid from the anolyte solution of a three compartment electrolytic conversion cell.

Another object is to chemically oxidize bisulfite ions in conjunction with electrolytic oxidation of the same.

Another object is to recover a part of the absorbed $SO_2$ as sulfuric acid with the remaining $SO_2$ stripped off and recovered as a concentrated gas stream.

Various other objects and advantages will appear from the following disclosure and the novel features will be particularly pointed out hereafter in connection with the appended claims.

In general the present invention as disclosed herein comprises a continuous self-regenerating liquid-phase $SO_2$ absorption system employing a novel combination of four basic steps for controlled stack gas purification and for the recovery of sulfuric acid from the system. The first step involves the electrolytic conversion of an ammonium or alkali metal sulfate salt into its corresponding acidic and basic components. The second step involves the absorption of sulfur dioxide from a gas stream into the aqueous basic solution (caustic) produced by the electrolytic cell to form predominately a bisulfite solution. The third step is directed to passing the spent caustic (bisulfite solution) to the anode compartment of the cell to electrolytically (anodically) oxidize the bisulfite ($HS\overline{O}_3$) to bisulfate ($HS\overline{O}_4$). In the fourth step the resulting anolyte effluent solution is evaporated to produce crystals of the original alkali metal salt which are separated from the mother liquor, redissolved in water, and the resulting solution clarified and recycled as feed to the cell to once again be electrolytically converted to the acidic and basic components. The sulfuric acid remaining as mother liquid from the crystallization step is withdrawn from the overall scrubber system and collected as a valuable by-product.

The principles and features of the invention are readily understood when taken in connection with the accompanying drawing by considering the basic steps for practicing the same. It is understood that details may be modified or varied without departure from the principles of the invention. The drawing is a schematic diagram illustrating generally the flow of materials and treatment thereof. For the purpose of simplicity the various valves, flowmeters, pressure gauges, switches, pumps, etc. which one skilled in the art might employ in the practice of the present invention are not all fully illustrated in the drawing.

The process for carrying out the invention will be described by way of example by reference to the apparatus shown schematically in the drawing and in particular to the employment of an alkali metal sulfate of sodium sulfate as the feed solution to the electrolytic cell. In the practice of the invention, a feed solution of sodium sulfate is passed from line 42 by pump 43 to the electrolytic cell 1 and by means of a source of direct current impressed across the cell through leads 50 and 51 (source not shown) the sodium sulfate feed material is split to result in the formation of primarily sodium acid sulfate and sodium hydroxide. The electrolytic cell is preferably of the type having three compartments, wherein the partition between the anode compartment 2 and the center feed compartment 3 is a diaphragm 4 of controlled porosity. Between the cathode compartment 5 and the center feed compartment 3 there is preferably a cation-permselective membrane 6. The cation membrane prevents bulk mixing of the center and cathode compartment solutions. If desired, the cation permselective membrane can be replaced with a second controlled porosity diaphragm. The non-permselective diaphragm 4 is of a design that will allow passage of electrolyte solution therethrough being preferably of such suitable acid-resistant microporous materials as, for example, rubber, ceramic, polyethylene, asbestos, Teflon and other synthetic fabrics such as polypropylene.

The cation permselective membrane is commonly of the type consisting of cation exchange substance in the form of thin sheets; said membranes being substantially hydraulically impermeable to water and to ions carrying a negative charge but permeable to ions carrying a positive charge. The art contains many examples of cation exchange materials which can be formed into cation permselective membranes. Preferable cation membrane 6 is a self supporting carboxylic acid type membrane such as that described in U.S. Pat. No. 2,731,408. Carboxylic membranes, per se, are manufactured by copolymerizing divinyl benzene and an olefinic carboxylic compound such as an anhydride, ester or acid chloride of acrylic acid and its derivatives in solution in a suitable solvent. The polymerized crosslinked solid material is saturated with water or an aqueous solution of an acid or base to convert the anhydride, ester or acid groupings in the polymeric matrix to salt or acid forms of carboxylate groups (—COO⁻ or —COOH). The solids are most useful where the solvent of polymerization in the crosslinked structure is replaced by water. The presence of an aqueous solvent phase in the material provides a solid structure which is electrically conductive and selectively permeable to cations. A cation permselective membrane of high selectivity is desired because the production of pure caustic in the cathode chamber is determined by the degree to which hydroxyl ions are prevented from migrating through the membrane. For example, if the carboxylic membrane is only 75% selective then one mol of hydroxyl ions is transferred or lost into the center compartment for every four moles of hydroxyl ions produced at the cathode.

The anode compartment 2 is provided with an acid resistant anode 7 (for example, lead, lead alloys of silver, antimony, tellurium and tallium, chilex, a tungsten bronze, platinum or platinum-coated electrolytic valve (metals), an outlet 8 for the anolyte liquid effluent product, outlet 9 for any gaseous anodic products which may form an inlet 60 for passage of spent caustic therein. The center feed compartment contains an inlet 10 through which the electrolyte feed solution is introduced.

The cathode compartment 5 defined from the center compartment 3 by the cation membrane 6 is provided with a caustic-resistant cathode 11 such as copper, lead or a lead alloy, nickel, iron or steel, an inlet 12 through which a sulfate electrolyte or water is passed, and inlet 61 for recycling caustic back into the compartment. Outlet 13 serves to withdraw the caustic catholyte product, and outlet 14 removes gaseous cathodic products such as hydrogen. The diaphragm, membrane and electrode components may be separated from each other by thin, gasketed spacers (not shown) which form the fluid-containing compartments of the cell.

In operation, a solution of an electrolyte, for example, sodium sulfate (or potassium sulfate) is introduced by pressure means such as a pump into the center compartment through inlet 10 at a rate and pressure which in its passage through the porous diaphragm (as shown by the arrow) is sufficient to substantially prevent the fast-moving hydrogen ions formed at the anode from migrating to the cathode in competition with the passage of alkali metal cations into said cathode compartment. Simultaneously, electrolyte or preferably water, is introduced into the cathode compartment via inlet 12. Under the influence of an impressed direct electric current, the cationic constituents of the electrolytic solution in the center compartment, for example, sodium ions, pass through the cation permselective membrane 6 into the cathode compartment. The combination of such alkali metal ion with hydroxyl ions produced at the cathode by the electrolysis of water forms the corresponding hydroxide, for example, sodium hydroxide. This catholyte caustic product is withdrawn through outlet 13 in a concentration dependent generally upon the current employed and the rate of liquid flow (such as water) into the cathode compartment. The electrolytic sulfate solution in the center feed compartment 3 now having been partially depleted of its positive ions (e.g. sodium) passes through the porous diaphragm into the anode compartment where combination of its free anionic groups (e.g. $SO_4^=$) with hydrogen ions produced by the electrolysis of water at the anode forms the corresponding acidic products, for example, sodium bisulfite. Additionally, the spent effluent solution from the $SO_2$ absorbing tower containing predominantly sodium bisulfite is passed directly into the anodic compartment 2 via line 31. The anodic reaction occurring therein results in the electrolytic oxidation of bisulfite into bisulfate as will be more fully disclosed hereinafter. The anolyte is withdrawn through outlet 8 as a liquid mixture containing primarily the acid sulfate salt. This liquid mixture will also contain varying amounts of sodium bisulfite in those cases where the direct current utilization at the anode is insufficient to fully oxidize all the bisulfite present in the spent caustic solution. Application of these processes toward the electrolysis of inorganic salts, for example, potassium, sodium and ammonium sulfate, whose corresponding acids are strongly acidic, results in the production of an anolyte effluent product from which such acid and original inorganic salt may be recovered.

The effluent caustic from the cathode compartment 5 is passed via line 15 into the caustic holdup, gas-liquid separation tank 16, subsequently withdrawn through line 18 and introduced into the top of an absorber apparatus or recycled through pump 24 back to the cathode compartment by way of recycle loop 20. The tower 19 may be of conventional design such as a counter current packed or spray tower. Simultaneously, a gas stream containing an acid gas such as $SO_2$ is introduced into the bottom of the tower through inlet gas line 21 by means of a gas blower 22 or other pumping means. It is during this absorption step where the initial small amount of $SO_2$ chemical oxidation will occur. Packed column absorbers are best operated countercurrently so as to allow contacting the less $SO_2$ contaminated gases with the most avid liquid-absorbing material. The descending caustic will absorb acidic substances such as $SO_2$ and then collect in the bottom of the tower at 25. The tower can be designed so that the caustic solution makes a single downward pass through the absorber. To improve the performance of the scrubbing action the caustic can be continuously recirculated therethrough by pumping means 26, a portion of the liquid being removed from the bottom of the tower and returned to inlet line 18 by means of return or recycle conduit 27. This recirculation provides continuous contact with the upwardly moving gas. The $SO_2$ depleted gas, after passing upwardly through the tower, is removed from the system at exit line 23 after first passing through a liquid-gas separator 17 to remove entrained liquid droplets from the gas. Where a single pass of the laden gas is not sufficient to remove the desired percentage of sulfur dioxide, part of the gas may be recycled by a pump 29 back to the bottom of the tower for further scrubbing by way of return conduit 30. Preferably, at least 80% $SO_2$ removal should be accomplished in a single pass or by recycling.

The spent or exhausted caustic solution (mostly $NaHSO_3$) is continuously bled from the absorber, carried away from the bottom of the tower by outlet 31 and passed directly into the anode compartment 2 by pumping means 32 where it mixes with the incoming solution from the center feed compartment. Fresh caustic from the electrolytic cell is continuously passed into the absorber to make up for the spent caustic removed through line 31. It is preferred that the spent caustic leaving the tower be largely converted to an alkali metal bisulfite through the absorption of $SO_2$ gas in accordance with the following reaction:

$$NaOH + SO_2(g) \rightarrow NaHSO_3$$

As previously stated the solution of spent caustic containing absorbed $SO_2$ primarily in the form of sodium bisulfite (with some sodium sulfite and/or sulfate) is carried from the absorber tower 19 and passed into the anode compartment of the electrolytic cell. Electrolytic oxidation of the bisulfite to bisulfate will rapidly occur at the anode since the bisulfite ion acts as a reducing agent. This electrode reaction will depolarize the anode and as noted in the following reaction no gaseous oxygen will be evolved. This depolarization effect will not only lower the anode voltage drop but will also reduce anodic attack.

$$H_2O \rightarrow \tfrac{1}{2}O_2 + 2H^+ - 2e$$
$$\tfrac{1}{2}O_2 + NaHSO_3 \rightarrow NaHSO_4$$
$$H_2O + NaHSO_3 \rightarrow 2H^+ + NaHSO_4 + 2e$$

This anodic oxidation will eventually result in the overall regeneration of the original $Na_2SO_4$ accompanied by the formation of $H_2SO_4$. The anolyte mixture may be recycled by a pump 33 through the anode compartment by way of recycle conduit 34 until the oxidation is substantially complete so that at steady state the bleed stream 35 from the anolyte recycle stream 34 is predominately sodium acid sulfate. This anolyte bleed stream 35 is passed into a vacuum type crystallizer 45 and then into an evaporation-crystallizer device 36 containing a boiler or heater 37. The crystallizers are employed in a manner well known in the art to remove the water content of the mixture to allow crystallization of the $Na_2SO_4$ and concentration of the sulfuric acid as by the following reaction:

$$2NaHSO_4 \rightarrow Na_2SO_4 + H_2SO_4$$

The sulfate crystals are separated from the sulfuric acid mother liquid, removed from both crystallizers via line 46 and passed to a mixing tank 38 to be redissolved in water. The sulfuric acid is removed from the end crystallizer and collected at line 58. The water for redissolving the sulfate crystals is preferably obtained from the condensate of the water vapor resulting from the crystallization steps. This water vapor is removed from the crystallizers at exit line 39, collected as a condensate and passed into the mixing tank. This water may also be passed through water line 40 into the oxidation tower 48 or it may be used when desired as feed to the cathode chamber 5 of the cell. A small amount of caustic may be removed from the caustic effluent line 15 by way of tap line 41 and added to the mixing tank 38 to neutralize any acid remaining therein and to cause the formation of hydroxide precipitates of heavy metal contaminants which may be present. The $Na_2SO_4$ solution is removed from the mixing tank and passed through clarification means 44 prior to passage as feed solution to the cell in order to minimize plugging of the porous diaphragm.

In the event the anolyte effluent 34 from the electrolytic cell still contains unoxidized sodium bisulfite, the solution may be tapped off through line 53 and passed into a gas oxidation type tower 48 prior to being introduced into the crystallizers. The oxidation tower should preferably contain a catalyst to accelerate and substantially complete the chemical oxidation of the remaining bisulfite. An oxygen containing gas such as air is directed into the tower through air inlet line 54 and the oxygen depleted air removed at air outlet line 55. To prevent any substantial loss of $SO_2$, water may be passed into the oxidation tower through water line 56. This water will absorb any $SO_2$ which may be stripped off with the air feed and return it back into the aqueous solution. The resulting bisulfate solution is removed from the oxidation tower and introduced into the crystallizers for treatment in the usual manner.

An alternate procedure is to dispense with additional oxidation of the anolyte effluent over that which is obtained by the electrolytic oxidation. Instead the anolyte is removed from the anolyte recycle conduit 34 and passed through line 47 into an $SO_2$ stripper tower 49 where the residual $SO_2$ of the solution is stripped off as for example by the use of heating means 52 for the purpose of reboiling the solution. The stripped $SO_2$ is evolved at exit line 57 where it is collected and preferably added to the sulfuric acid solution being removed from the crystallizer at effluent acid line 58. The resulting solution from the stripper which is substantially void in bisulfite is directed into the crystallizer apparatus for the separation, recovery and reuse of sodium sulfate.

Although the invention has been described in connection with a single 3-compartment cell, it will be understood that for practical and commercial applications a plurality of such cells will be required to form a multi-cell electrolytic conversion apparatus or stack.

The following examples are illustrative of the practice of this invention and are not intended to be limiting:

EXAMPLE 1

This example illustrates the use of chemical oxidation in conjunction with electrolytic oxidation to obtain substantially complete conversion of all the bisulfite ions to bisulfate resulting in the recovery of all of the absorbed $SO_2$ in the form of sulfuric acid.

An electrolytic stack containing a plurality of twenty cells of the heretofore described three compartment cell is used to convert a one molar (2 normal) aqueous solution of sodium sulfate into essentially sodium acid sulfate and sodium hydroxide. The cells all have lead alloy anodes containing 2% silver with 1% tellurium and nickel sheet cathodes. The diaphragms are microporous polypropylene and are physically supported on their anode facing side by polypropylene screen placed within the anode compartment. Screen material having a thickness of about two millimeters is similarly placed in the remaining compartments and essentially determines the spacing thickness of these compartments. The cation exchange membrane facing the catholyte compartments are the carboxylic type prepared from a mixture of divinyl benzene, ethyl styrene and acrylic acid. The peripheral edges of the compartments are fitted with synthetic plastic gaskets having a compressed thickness equal to about the thickness of the compartments.

One molar sodium sulfate solution is introduced into the center feed compartments of the multi cell stack at a flow rate of about 40 liters per hours (2 liters per cell). The voltage required is about 4.0 volts D.C. per cell and the temperature of the cells is maintained at about 140° F. by recirculating both the anolyte and catholyte through heat exchangers. The current density at the anodes and cathodes is 120 amperes per square foot.

At steady state a total of about 20 liters per hour of caustic is bled from the recirculating catholyte stream.

Water is added as feed to the cathode compartments of the stack in an amount sufficient to maintain the caustic effluent concentration at 2 molar.

The 2-molar caustic solution removed from the recirculating caustic stream is contacted counter-currently with a simulated flue gas (0.3% by volume of $SO_2$) in an absorption column packed with polyethylene Raschig rings. The caustic and waste gas flows and the height of the packing are adjusted to remove about 90% of the $SO_2$ content of the waste gas to produce a total of about 24 liters per hour of liquid effluent comprising about 34.2 gram moles of $NaHSO_3$ and 3.6 gram moles of $Na_2SO_4$ per hour. The $Na_2SO_4$ formed represents the amount of $SO_2$ chemical oxidation occurring during the absorption step and is about 10% of the total $SO_2$ passed into the system. The spent caustic solution from the absorption column is introduced continuously into the anode compartments of the stack where it mixes and combines with the center cell solution entering the anode compartments through the separating porous diaphragm. The anolyte solution is recirculated through the compartments and constantly bled from the recirculating loop at a rate of about 60 liters total per hour. At steady state this anolyte effluent is removed at a rate of 60 liters per hour and is found on a per hour basis to comprise about 62.7 gram mole of $NaHSO_4$, 10.4 gram mole of unoxidized $NaHSO_3$ and about 3.1 gram mole of $Na_2SO_4$. There is no noticeable release of oxygen gas at the anode indicating substantially 100% current efficiency for the anodic oxidation of $H\overline{SO}_3$. To complete the oxidation of the remaining $NaHSO_3$, the anolyte effluent is introduced into a catalyst containing oxidation tower where contact with air ($O_2$) completes the oxidation process. About 10.8 liter per hour of water at 70° F. is passed downward into the oxidation tower to prevent any stripped $SO_2$ from leaving the tower with the oxygen depleted air. The air feed rate into the oxidation tower is about 2340 liters per hour at 70° F. The effluent solution from the oxidation tower contains predominantly $NaHSO_4$. It is collected at a rate of about 70 liters per hour (130° F.) and passed to crystallizer towers where sodium sulfate is separated as follows:

$$2NaHSO_4 \rightarrow Na_2SO_4 + H_2SO_4$$

The completely oxidized solution is first treated in a vacuum type crystallizer where some water is removed and about 70% of the total dissolved $Na_2SO_4$ is separated as hydrate crystals by vacuum cooling to about 80° F. The acidic mother liquid is removed from the first crystallizer at a rate of about 60 liters per hour and introduced into a fractionating evaporator type tower where most of the water is boiled off resulting in the crystallization and separation of substantially the remaining dissolved sodium sulfate. The mother liquor is removed from the second crystallizer at a rate of about 2.8 liters per hour and is analyzed as 78% sulfuric acid.

EXAMPLE 2

This example illustrates the process where unoxidized $H\overline{SO}_3$ remaining in the anolyte bleed effluent is not chemically oxidized as in the previous example but instead the solution is stripped of its residual $SO_2$ by reboiling with the moist $SO_2$ collected being suitable for the manufacture of sulfuric acid.

A twenty cell stack is operated in the same manner as Example 1. The 60 liters per hour of anolyte solution is removed from the cell containing unoxidized $NaHSO_3$ is introduced into an $SO_2$ stripper tower of the general type containing a stripping and enriching section and condensing and reflux means. Moist $SO_2$ is stripped off at an hourly rate of about 10.4 grams mole. The hot solution (210° F) leaving the bottom of the stripping column is collected at a rate of 54 liters per hour and analyzed as primarily $NaHSO_4$ with substantially no bisulfite ions present. This effluent from the stripper column is treated in the crystallizers in the same manner as described in Example 1 to recover crystals of $Na_2SO_4$ and 78% sulfuric acid. The crystals are redissolved in water and employed as feed solution to the center compartments of the electrolytic cell. The $SO_2$ recovered from the stripper may be oxidized to $SO_3$ (as by the contact process) and absorbed on to the 78% sulfuric acid recovered from the crystallizers to raise the acid concentration to about 83%.

EXAMPLE 3

This example illustrates the process of increasing the direct current (Faradays) passed through the electrolytic stack in an amount sufficient to effect the complete oxidation of $HSO_3$ by the anodic reaction above without the need for the addition of chemical oxidation.

The same twenty cell stack and auxiliary equipment is employed as that of the previous examples however the use of an oxidizer or stripper is dispensed with. The stack is operated at an increased current density of 144 amperes per square foot at 5 volts per cell. A one molar solution of sodium sulfate is introduced into the center compartments of the stack at a total flow rate of 30 liters per hour (1.5 liters per cell). At steady state 24.4 liters per hour of two normal caustic solution is removed from the recirculating catholyte loop and makeup water is continuously added to the cathode chambers in an amount sufficient to maintain the required caustic concentration. This caustic is passed into the $SO_2$ absorption column where 90% of the $SO_2$ content (0.3% by volume) of a simulated flue gas is removed therefrom. Spent caustic is removed from the absorber at about 26.8 liters per hour which on a per hour time basis comprises 11.4 gram moles of $NaHSO_3$, 15.6 gram moles of $Na_2SO_3$ and about 3 gram moles of $Na_2SO_4$. This spent caustic is continuously introduced into the anode chambers of the stack whereby the $HSO_3$ content is electrolytically oxidized to $HSO_4$. The anolyte solution is recirculated through the anode compartments and a continuous bleed of anolyte solution is maintained at a rate of 50 liters per hour of 1.2 molar $NaHSO_4$ solution. This anolyte solution containing substantially no unoxidized $NaHSO_3$ is treated in the crystallizers in the usual manner to separate and recover crystals of $Na_2SO_4$ and a mother liquid of concentrated sulfuric acid.

I claim:
1. A process for the removal of $SO_2$ from gases containing the same with subsequent recovery of at least a part of the $SO_2$ in the form of sulfuric acid which process comprises the steps of:
   (a) partially converting an aqueous salt feed solution of an alkaline metal sulfate into its corresponding acidic and caustic alkaline solutions by introducing said feed solution into at least the center compartment of a three compartment electrolytic cell wherein the center compartment is disposed between a cathode and anode containing electrode compartment respectively, said center compartment separated from the adjacent cathode compartment by a cation exchange membrane and from the adjacent anode compartment by a liquid permeable microporous diaphragm, maintaining sufficient pressure in said center compartment to cause the feed solution to pass through said porous diaphragm into the adjacent anode compartment, introducing an aqueous liquid into said cathode compartment, passing a direct current across the electrodes transversely through said compartments to produce a caustic solution at said cathode and an acid solution at said anode;
   (b) contacting the cathode effluent caustic solution with the $SO_2$ containing gas whereby the absorption of said $SO_2$ results in the formation of spent caustic solution comprised predominately of alkali metal bisulfite;
   (c) passing at least a portion of said spent caustic into the anode compartment of the electrolytic cell whereby anodic oxidation of bisulfite to bisulfate results;

(d) collecting the resulting anolyte solution and evaporating the same to separate crystals of alkali metal sulfate from the acidic mother liquid;

(e) redissolving said crystals of alkali metal sulfate and passing at least a portion of the resulting solution back to said electrolytic cell as feed solution and (f) recovering and collecting the mother liquid remaining from the crystallization step.

2. The process of claim 1 wwherein the alkaline metal sulfate is selected from the group consisting of sodium sulfate, potassium sulfate, lithium sulfate, and mixtures thereof.

3. The process of claim 1 wherein a plurality of said electrolytic cells are employed.

4. The process of claim 1 wherein the aqueous liquid introduced into said cathode compartment is water.

5. The process of claim 1 wherein the liquid anolyte mixture is recirculated through said anode compartment and wherein a portion of said liquid is continuously bled therefrom.

6. The process of claim 1 wherein the alkali metal sulfate crystals are redissolved in at least a portion of the water condensed and collected from the evaporation step.

7. The process of claim 1 wherein the solution resulting from the redissolving of alkali metal sulfate crystals is first treated with alkali metal caustic and clarified prior to passage as feed solution to said electrolytic cell.

8. The process of claim 1 wherein the anolyte solution effluent prior to evaporation and crystallization is first contacted with an oxygen containing gas to substantially complete the chemical oxidation of any remaining bisulfite which escaped the electrolytic oxidation.

9. The process of claim 1 wherein the anolyte solution effluent is reboiled prior to evaporation and crystallization whereby any unoxidized bisulfite ions remaining in said solution is stripped of its $SO_2$ content.

10. The process of claim 9 wherein the $SO_2$ recovered from the stripping process is absorbed on the sulfuric acid recovered from the crystallization step thereby increasing the concentration of said acid.

11. A process for producing sulfuric acid and an alkali metal sulfate salt comprising electrolytically oxidizing an alkali metal bisulfite salt solution to bisulfate by passing said bisulfite salt solution in contact with the anode electrode of an electrolytic cell, collecting the resulting liquid effluent anolyte mixture, separating crystals of said alkali metal sulfate salt from said anolyte mixture and recovering the sulfuric acid containing mother liquid.

12. The process of claim 11 wherein the alkali metal bisulfite salt solution is obtained from the absorption of $SO_2$ in an aqueous alkali metal caustic solution.

13. The process of claim 11 wherein said liquid effluent anolyte mixture is treated to further oxidation by contact with an oxygen containing gas prior to crystallization of said sulfate salt.

References Cited

UNITED STATES PATENTS

| | | | |
|---|---|---|---|
| 2,768,945 | 10/1956 | Shapiro | 204—72 |
| 3,135,673 | 6/1964 | Tirrell et al. | 204—98 |
| 3,165,460 | 1/1965 | Zang et al. | 204—301 |
| 3,222,267 | 12/1965 | Tirrell et al. | 204—98 |
| 3,344,050 | 9/1967 | Mayland et al. | 204—98 |
| 3,433,726 | 3/1969 | Parsi et al. | 204—180 |

HOWARD S. WILLIAMS, Primary Examiner

A. C. PRESCOTT, Assistant Examiner

U.S. Cl. X.R.

23—2, 178; 204—180, 98